(12) United States Patent
Yu (10) Patent No.: US 7,751,395 B2
(45) Date of Patent: Jul. 6, 2010

(54) METHOD FOR PREVENTING SIMULTANEOUS ISSUANCE OF TWO MULTICAST FLOWS

(75) Inventor: Dawei Yu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 467 days.

(21) Appl. No.: 11/612,806

(22) Filed: Dec. 19, 2006

(65) Prior Publication Data

US 2007/0147373 A1 Jun. 28, 2007

(30) Foreign Application Priority Data

Dec. 19, 2005 (CN) .................. 2005 1 0121004

(51) Int. Cl.
*H04L 12/28* (2006.01)
(52) U.S. Cl. .................. 370/390; 370/432; 725/118
(58) Field of Classification Search .................. 370/390, 370/432; 725/118, 148
See application file for complete search history.

(56) References Cited

U.S. PATENT DOCUMENTS

| | | | |
|---|---|---|---|
| 7,272,652 B1 * | 9/2007 | Keller-Tuberg | ............. 709/227 |
| 2002/0150094 A1 | 10/2002 | Cheng et al. | |
| 2004/0088348 A1 * | 5/2004 | Yeager et al. | ............... 709/202 |
| 2004/0090970 A1 * | 5/2004 | Sanchez et al. | ............. 370/397 |
| 2004/0264443 A1 | 12/2004 | Beck et al. | |
| 2005/0028206 A1 * | 2/2005 | Cameron et al. | ............... 725/46 |
| 2005/0220132 A1 | 10/2005 | Oman et al. | |
| 2005/0235318 A1 * | 10/2005 | Grauch et al. | ................. 725/46 |
| 2007/0044123 A1 * | 2/2007 | Zriny et al. | .................... 725/52 |

FOREIGN PATENT DOCUMENTS

| | | |
|---|---|---|
| CN | 1675880 A | 9/2005 |
| EP | 1119134 A2 | 7/2001 |
| EP | 1331755 A2 | 7/2003 |
| EP | 1427132 A2 | 6/2004 |
| EP | 1429489 A2 | 6/2004 |
| WO | 2004/086245 | 10/2004 |

OTHER PUBLICATIONS

Chinese Office Action for Chinese Patent Application No. 2005101210046, dated Dec. 26, 2008, and English translation thereof.
European Search Report for European Application No. 06804924.6 dated May 14, 2009.

* cited by examiner

*Primary Examiner*—Dang T Ton
*Assistant Examiner*—Wei Zhao (57) ABSTRACT

A method for preventing simultaneous issuance of two multicast flows, comprising a process of ceasing the transmission of a multicast flow upon an internet protocol set-top box (IP STB) being switched on; the ceasing of the multicast flow transmission can be initiated by the IP STB or by communication entities on the network side. The method provided by the present invention prevents simultaneous issuance of two multicast flows and thus eliminates unfavorable consequences of simultaneous issuance of two multicast flows, including picture quality loss and even abnormal restart of an IP STB, therefore the user experiences will be improved and user satisfaction will be distinctively increased.

8 Claims, 5 Drawing Sheets

METHOD FOR PREVENTING SIMULTANEOUS ISSUANCE OF TWO MULTICAST FLOWS

CROSS-REFERENCE TO RELATED APPLICATIONS

This application claims the benefit of Chinese Patent Application No. 200510121004.6 filed on Dec. 19, 2005. The disclosure of the above application is incorporated herein by reference.

FIELD

The present disclosure relates to internet protocol television technology, and particularly, to a method for preventing simultaneous issuance of two multicast flows.

BACKGROUND

The statements in this section merely provide background information related to the present disclosure and may not constitute prior art.

Internet protocol television (IPTV) is a brand new media of customized interactive services based on internet technology. Broadcast TV (BTV) is the very basic service in an IPTV system and the most matured service in the industry. In consideration of program forecasts, brand advertisements and commercials, operators usually set a default switch-on channel to broadcast program forecasts, brand advertisements and commercials so that the contents broadcast through the default switch-on channel are received as soon as an IP set-top box (STB) is powered on. The default switch-on channel is usually set on Channel 1.

BTV is a multicast-based service and is dependent of multicast route protocol, internet group management protocol (IGMP) and IGMP Proxy protocol etc. which are supported by network devices. When an IPTV system transmits multicast program flows to an access network, routers in the network usually comply with multicast route protocol and network devices in the access network comply with IPMP Proxy protocol.

An IP STB is a user terminal device in an IPTV system and the storage in the IP STB usually stores a channel list which contains the multicast IP addresses, multicast port numbers and other channel related information of the channels that a user is authorized to view. When a user is receiving a BTV service, his IP STB first searches for the multicast address and multicast port number of the channel that the user wants to watch from the channel list according to the instruction from a remote controller, then the IP STB composes an IGMP Report message according to the requirements of REC2236, and applies to join a corresponding multicast group, and finally the IP STB receives the multicast flow from an IPTV service source network after network devices of all levels have performed IGMP Proxy protocol.

When the user wants to switch to another channel, the IP STB first composes an IGMP Leave message according to the requirements of RFC2236 to leave the current multicast group, hence the transmission of the multicast flow of the current channel is ceased; then the IP STB searches for the multicast address and multicast port of the channel that the user wants to watch from the channel list and composes an IGMP Report message according to the requirements of RFC2236 to join a corresponding new multicast group, then the multicast flow of the new channel is transmitted to the IP STB.

When the IP STB switches from BTV service to another service, the IP STB first composes an IGMP Leave message according to the requirements of RFC2236 to leave the current multicast group, hence the transmission of the multicast flow of the current channel is ceased; then the IP STB sends a corresponding report according to the instruction from the user to obtain a new service.

When an IP STB in the prior art needs to restart due to malfunction (sudden power breakdown, mis-pressing the power button by man, etc.) while carrying out BTV service, the technical solution in the prior art is sending an IGMP Report message to join the multicast group of the default switch-on channel of BTV service directly after the IP STB is powered on, no matter whether the multicast flow which was transmitted when the malfunction occurred has been ceased.

At the very moment when such malfunction occurs, the IP STB is not able to send an IGMP Leave message to leave the current multicast group. Meanwhile, there is a very small probability of the current multicast group being the default switch-on channel, and the probability equals to 1/total number of BTV programs that a user is authorized to watch.

When the IP STB switches on and directly sends an IGMP Report message to join the multicast group of the default switch-on channel, the multicast flow which was transmitted when the malfunction occurs is usually still transmitted to the IP STB, because the digital subscriber line access multiplexer (DSLAM) which sends the multicast flow to the IP STB is unable to learn the situation of the IP STB when the IP STB malfunctioned. In practical applications, a DSLAM has to send an IGMP general query and a group-specific query to make sure whether an IP STB in the current multicast group is active.

RFC2236 defines that the interval for IGMP Query message is 125 seconds and the maximum response time to an IGMP Query message is 10 seconds. RFC2236 does not define how long a device should wait, after a general query is transmit, and then transmit a group-specific query (the interval length varies with devices from different manufacturers, usually a group-specific query is sent 20 seconds after an IGMP Query message is sent) or the number of sending times and interval length of group-specific queries (devices from different manufacturers make different settings, usually a group-specific query is sent twice with an interval of 4 seconds).

If the IP STB malfunctions after the DSLAM has sent an IGMP Query message and before the IP STB returns a corresponding response message, the DSLAM will send the IGMP Query message once again and further send a group-specific query twice to check whether the multicast group member which malfunctions has left the multicast group; then the DSLAM will cease the transmission of the multicast flow which is transmitted to the IP STB when it malfunctions. That is to say, if the IP STB malfunctions after the DSLAM has sent a general query and before the IP STB returns a corresponding report, the transmission of the multicast flow which is transmitted to the IP STB when the IP STB malfunctions will continue for about 144 seconds.

If the IP STB malfunctions when the DSLAM sends an IGMP Query message and the IP STB returns a corresponding response message, the DSLAM will send IGMP Query message twice again and further send a group-specific query twice to check whether the multicast group member which malfunctions has left the multicast group; then the DSLAM will cease the transmission of the multicast flow which is transmitted to the IP STB when the IP STB malfunctions. That is to say, if the IP STB malfunctions when the DSLAM sends an IGMP Query message and the IP STB returns a corresponding response message, the transmission of the multicast flow which is transmitted to the IP STB when the IP STB malfunctions will continue for about 269 seconds.

It can be concluded from the above that when an IP STB malfunctions, the transmission of the multicast flow to the IP STB will continue for about 144 to 269 seconds.

Furthermore, when malfunction occurs, an IP STB needs about 20 seconds to restart, compose an IGMP Report message and apply to join the multicast group of the default switch-on channel, after that the multicast flow of the default switch-on channel will be sent to the IP STB. Obviously, this will cause the situation in which the multicast flow which the IP STB has been receiving when the IP STB malfunctions and the multicast flow of the default switch-on channel are issued to the IP STB simultaneously, and the situation is called simultaneous issuance of two multicast flows.

Simultaneous issuance of two multicast flows usually lasts 124 to 249 seconds (or 119 to 254 seconds in some extreme cases). Simultaneous issuance of two multicast flows brings in two harmful consequences: firstly, the total bandwidth of two multicast flows usually exceeds the service operation bandwidth provided for a user by an IPTV system, which results in serious package loss in the multicast flows transmitted to the IP STB, reflected in frozen motions and mosaic; secondly, as there are two multicast flows transmitted to an IP STB simultaneously, the service performance of the IP STB will be affected, which causes unsmooth playback of the IP STB at least and even abnormal restart of the IP STB.

To sum up, in the prior art two multicast flows may be issued to an IP STB simultaneously for a long time, which seriously degrades picture quality and may even cause the IP STB to restart abnormally. This will influence user experience to a great extent and decrease user satisfaction.

SUMMARY

The present invention provides a method for preventing simultaneous issuance of two multicast flows which causes serious damage to picture quality and even abnormal restart of an IP STB in the prior art, and an IP STB and a DSLAM for implementing the method.

The technical solution in accordance with the present invention is achieved as follows.

A method for preventing simultaneous issuance of two multicast flows includes the following process:

ceasing, by a digital subscriber line access multiplexer (DSLAM), a transmission of a multicast flow to an internet protocol set-top box (IP STB) when the IP STB is switched on;

automatically composing and sending an IGMP Report message, by the IP STB immediately upon being switched on, based on contents of a channel list stored in the IP STB, and joining a multicast group of a default switch-on channel;

according to a received user instruction, performing at least one of the following operations: switching channels, switching to a non-BTV service and switching off;

wherein the switching channels comprises: sending the IGMP Leave message to leave a current multicast group; searching a multicast IP address and a multicast port number of a channel chosen by a user in a channel list; composing an IGMP Report message based on the multicast IP address and the multicast port number found and sending the IGMP Report message to join a new multicast group;

when the IP STB joining the new multicast group, if the channel chosen by the user is not the default switch-on channel, updating the multicast IP address, the multicast port number and verification information of the new multicast group with the multicast IP address, the multicast port number and verification information stored in the IP STB;

if the channel chosen by the user is the default switch-on channel, do not updating the multicast IP address, the multicast port number and verification information of the new multicast group.

Compared with the practice in the prior art, the method provided by the present invention prevents simultaneous issuance of two multicast flows and thus eliminates unfavourable consequences resulting from simultaneous issuance of two multicast flows, including picture quality loss and even abnormal restart of an IP STB, therefore the user experiences will be improved and user satisfaction will be distinctively increased.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A detailed description of the present invention is provided hereinafter with reference to the accompanying drawings and specific embodiments.

Figure 1:
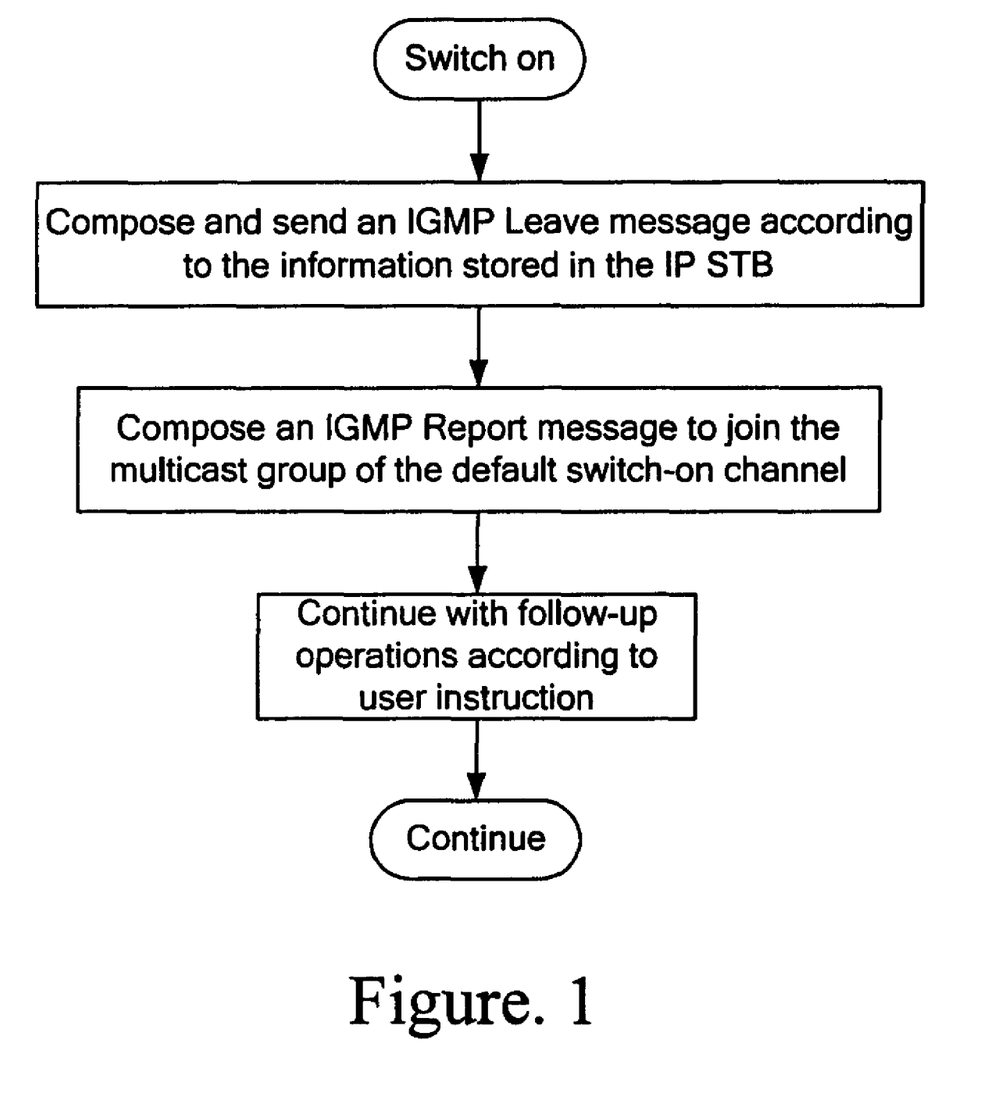
FIG. 1 is the IP STB operation flowchart of a first embodiment of this invention.

FIG. 1 is the IP STB operation flowchart of a first embodiment of this invention. As shown in FIG. 1, when an IP STB is powered on, the IP STB first composes and sends an IGMP Leave message according to the information stored in the IP STB to leave the multicast group to which the IP STB has belonged when malfunction occurred to the IP STB. The information stored in the IP STB includes the multicast IP address and the multicast port number of the multicast group of the last channel chosen by the user before the IP STB was shut down (or powered off in malfunction). Upon receiving the IGMP Leave message from the IP STB, the DSLAM ceases the transmission of the multicast flow corresponding to the IGMP Leave message to the IP STB, wherein the multicast flow is the multicast flow that was transmitted to the IP STB when malfunction occurred to the IP STB.

Obviously, when an IP STB was powered off accidentally while carrying out BTV service, the IP STB may smoothly leave the multicast group to which the IP STB has belonged when the IP STB was powered off through the above method upon being switched on. After that, the IP STB may further compose an IGMP Report message based on the contents of the channel list stored in the IP STB and send the IGMP Report message to join the default switch-on channel. Then the IP STB may continue with follow-up operations including switching channel, switching to non-BTV service or shutting down according to user instructions.

Figure 2:
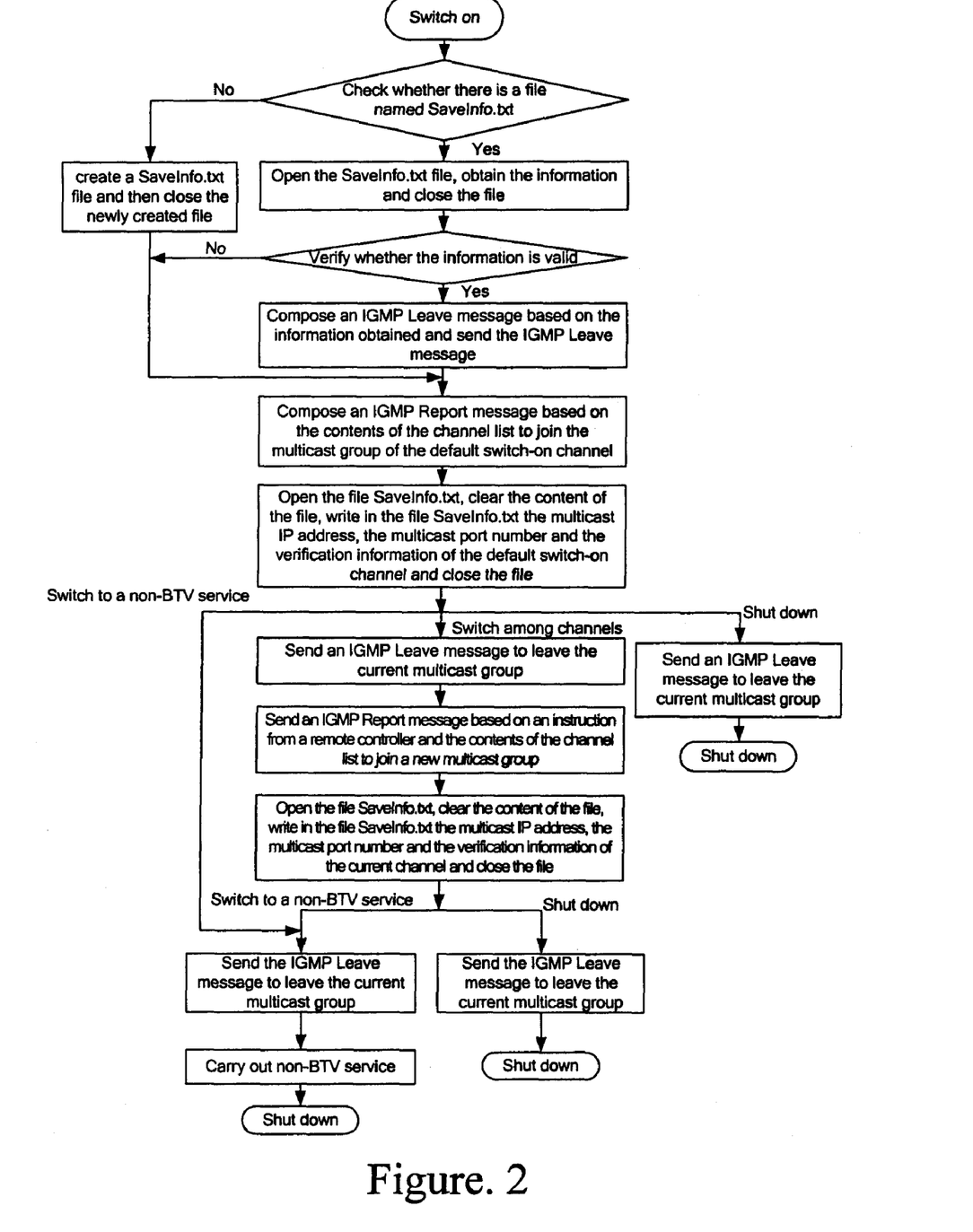
FIG. 2 is the IP STB operation flowchart of a second embodiment of this invention.

FIG. 2 is the IP STB operation flowchart of a second embodiment of this invention. Usually an IP STB is equipped with a non volatile memory (NVM) in which a file system is set up, and in the file system a file named SaveInfo.txt (or other names) is usually created to store information. In practical applications, the file SaveInfo.txt can be used for storing the multicast IP address, multicast port number and the verification information of the multicast group to which the IP STB currently belongs.

As shown in FIG. 2, upon being switched on, an IP STB firstly checks whether there is a file named SaveInfo.txt, and if there is such a file, the IP STB opens the file to obtain the information therein and then closes the file SaveInfo.txt. When the information obtained has passed verification, the IP STB composes an IGMP Leave message based on the information according to the IGMP Leave message format defined by RFC2236, and sends the IGMP Leave message. If there is no file named SaveInfo.txt, a SaveInfo.txt file should be created and then closed.

Hence the transmission of the multicast flow, which was transmitted to the IP STB when malfunction occurred, is ceased and simultaneous issuance of two multicast flows in the prior art is prevented.

When the IGMP Leave message is sent, the IP STB composes an IGMP Report message based on the multicast IP address and the multicast port information of the default switch-on channel in the channel list of the IP STB and sends the IGMP Report message so as to join the multicast group of the default switch-on channel. Then the IP STB opens the file SaveInfo.txt which is stored in the IP STB, writes the multicast IP address, the multicast port number and the verification information of the default switch-on channel into the file SaveInfo.txt and closes the file. Then the multicast flow provided by the IP STB for the user is the multicast program of the default switch-on channel.

While carrying out the multicast service of the default switch-on channel, the IP STB may receive the following three instructions:

1. channel switch instruction (switch among BTV services);
2. service switch instruction (switch between a BTV service and a non-BTV service provided by the IP STB);
3. shut down instruction.

For the above three instructions, the IP STB can perform the corresponding handling processes as below:

When a channel switch instruction is received, the IP STB performs a first handling process which includes the steps of: sending an IGMP Leave message by the IP STB to leave the current multicast group, searching for, according to the instruction from a remote controller, the multicast address and multicast port number of the channel corresponding to the instruction from the channel list stored in the IP STB, composing an IGMP Report message based on the multicast address and multicast port number obtained and sending the IGMP Report message; then opening the file SaveInfo.txt, clearing the content of the file, writing in the file SaveInfo.txt the multicast IP address, the multicast port number and the verification information of the channel after the switch and closing the file.

It can be concluded that the information in the file SaveInfo.txt should be updated with the multicast IP address, the multicast port number and the verification information of the new channel each time during a channel switching. The update of the file SaveInfo.txt is important. And obviously, if the new channel to which the IP STB switches is the default switch-on channel, the file SaveInfo.txt need not to be updated.

When a service switch instruction is received, the IP STB performs a second handling process which includes the steps of: sending an IGMP Leave message by the IP STB when the IP STB switches from a BTV service to a non-BTV service, to leave the current multicast group and sending a corresponding message according to the instruction received to request for a non-BTV service.

When a shut down instruction is received, the IP STB performs a third handling process which includes the steps of: sending an IGMP Leave message by the IP STB to leave the current multicast group and performing the shut down process.

When the IP STB has completed channel switch, it may further receive a service switch instruction (switch from a BTV service to a non-BTV service) or a shut down instruction. If a service switch instruction is received, the IP STB performs the second handling process above; if a shut down instruction is received, the IP STB performs the third handling process above.

When the IP STB has switched from a BTV service to a non-BTV service, it may further receive an instruction of switching from a non-BTV service to a BTV service or a shut down instruction. If an instruction of switching from a non-BTV service to a BTV service is received, the IP STB performs a process similar to the first handling process, wherein the step of sending an IGMP Leave message to leave the current multicast group is omitted; if a shut down instruction is received, the IP STB directly performs the shut down process.

The process shown in FIG. 2 is performed on the basis that there is a file system in the NVM. When there is no file system in the NVM, the multicast IP address and the multicast port number of the current multicast group can be stored in a block of the IP STB as in another embodiment of the present invention, and the information is stored, read and updated through Block operation interface functions.

Furthermore, in the process shown in FIG. 2, when the multicast IP address, multicast port number and verification information are stored in the file SaveInfo.txt, the default switch-on channel and other channels are regarded as equals. In fact, if the IP STB is carrying out the BTV service of the default switch-on channel when malfunction occurs, and if the IP STB joins the multicast group of the default switch-on channel upon being switched on, according to the principle of multicast, there will not be two multicast flows of the default switch-on channel transmitted to the IP STB, so it is not necessary to store the multicast IP address, multicast port number and verification information of the default switch-on channel in the service process of an IP STB.

For example, when the IP STB is switched on and joins the multicast group of the default switch-on channel for the first time, the step of writing the multicast IP address, multicast port number and verification information of the default switch-on channel into the file SaveInfo.txt (or a block) can be omitted. Moreover, after the IP STB has switched to another channel and before the multicast IP address, multicast port number and verification information of the new channel are stored in the file SaveInfo.txt, a step of determining whether the current multicast channel is the default switch-on channel can be performed and if the current multicast channel is the default switch-on channel, the step of writing the multicast IP address, multicast port number and verification information of the default switch-on channel into the file SaveInfo.txt (or a block) can be omitted; otherwise the multicast IP address, multicast port number and verification information of new channel shall be written into the file SaveInfo.txt (or a block).

Usually a channel list is stored in the storage of an IP STB and the channel list stores the multicast IP addresses, multicast port numbers and other channel related information of all the channels that a user is authorized to watch.

In the process shown in FIG. 2, a method including a step of storing related information in the file system in the NVM is provided to ensure that an IGMP Leave message is sent before an IGMP Report message, an alternative solution is also provided in case there is no file system in the NVM; moreover, a method is provided in which the multicast IP addresses, multicast port numbers and verification information of the default switch-on channel need not to be stored in the file SaveInfo.txt; besides, the verification information is taken into consideration, too. Therefore, the IP STB work process shown in FIG. 2 is effective and steady.

Obviously, the process shown in FIG. 2 is storing the multicast IP addresses, multicast port numbers and verification information of channel while carrying out a BTV service; when an IP STB restarts after an abnormal shutdown, the IP STB accesses the stored related information to compose an IGMP Leave message, and sends the IGMP Leave message before sending an IGMP Report message, so that simultaneous issuance of two multicast flows is prevented.

Figure 3:
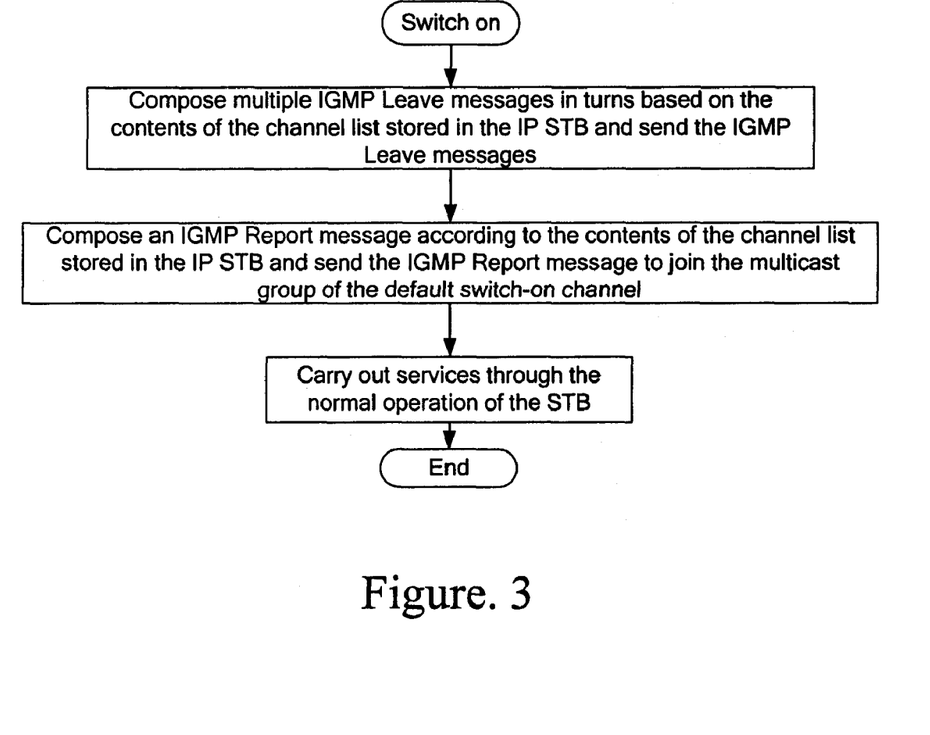
FIG. 3 is the IP STB operation flowchart of a third embodiment of this invention.

FIG. 3 is the IP STB operation flowchart of a third embodiment of this invention. As shown in FIG. 3, when an IP STB is switched on in a random situation (including an abnormal situation), the IP STB composes multiple IGMP Leave messages, each of which corresponds to a channel that the user is authorized to watch, according to the contents of the channel list stored in the IP STB and sends the IGMP Leave messages in turn. Through such a method the IP STB may initiatively leave the multicast group to which it belonged when malfunction occurred.

Then the IP STB composes an IGMP Report message based on the multicast IP address and the multicast port information of the default switch-on channel in its own channel list and sends the IGMP Report message and joins the multicast group of the default switch-on channel.

Then the IP STB may continue with follow-up operations including switching channel, switching to a non-BTV service or shutting down, according to user instructions.

It can be seen that the process shown in FIG. 3 goes through the channel list, and ensures that corresponding IGMP Leave messages of all channels which the user is authorized to watch will be sent in turn, so that the transmission of the multicast flow which continues after malfunction occurs to the IP STB could be ceased. Supposing a user is authorized to watch 100 multicast channels, the time an IP STB spends in sending an IGMP Leave message corresponding to one of the 100 channels can be less than a millisecond. With the capacity of DSLAM and network congestion in consideration, the IGMP Leave message interval can be set to be 1 millisecond so that all the IGMP Leave messages can be sent within 0.1 second after the IP STB is switched on, thus it takes very short time for the IP STB to stop the transmission of the multicast flow which continues after malfunction occurred to the STB.

It can be seen from the above that in the methods shown in FIGS. 1 to 3, an IP STB sends an IGMP Leave message initiatively to prevent simultaneous issuance of multicast flows.

In fact, the communication entities on the network side can also initiatively cease the transmission of the multicast flow which continues after malfunction occurred to the IP STB to prevent simultaneous issuance of multicast flows. The detailed processes are shown in FIG. 4 and FIG. 5.

Figure 4:
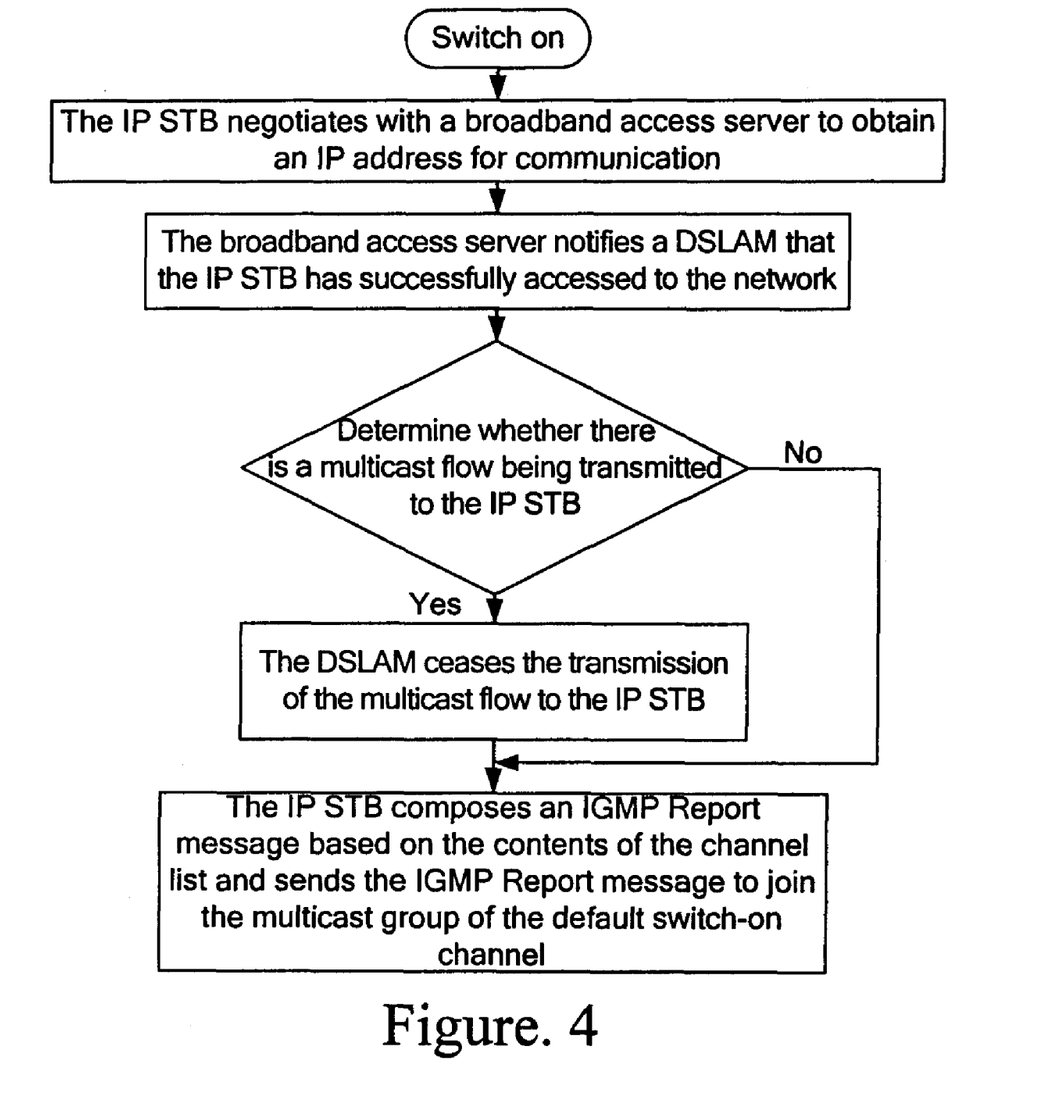
FIG. 4 is the IP STB operation flowchart of a fourth embodiment of this invention.
Figure 5:
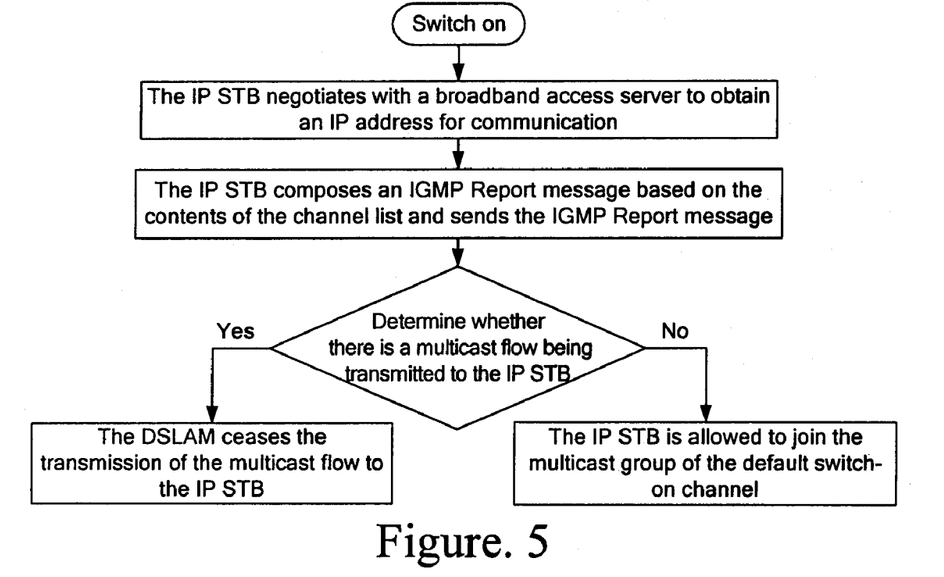
FIG. 5 is the IP STB operation flowchart of a fifth embodiment of this invention.

FIG. 4 is the IP STB operation flowchart of a fourth embodiment of this invention. As shown in FIG. 4, when an IP STB is switched on in a random situation (including an abnormal situation), the IP STB negotiates with a broadband access server through relevant protocols and the broadband access server allocates an IP address for the communication of the IP STB after a successful negotiation; meanwhile, the broadband access server can also notify a DSLAM through a message or other means that the IP STB has successfully accessed the network.

Upon receiving the notification from the broadband access server, the DSLAM queries whether there is a multicast flow being transmitted to the IP STB currently, and, if there is a multicast flow being transmitted to the IP STB currently, the DSLAM ceases the transmission to the IP STB. And when the IP STB does not receive multicast flow from the DSLAM any more, the IP STB composes an IGMP Report message based on the contents of the channel list stored in the IP STB itself and sends the IGMP Report message to join the multicast group of the default switch-on channel.

Obviously, if the DSLAM determines there is no multicast flow being transmitted to the IP STB, the DSLAM may continue with other operations in the prior art. In this case, the IP STB can still composes and sends an IGMP Report message based on the contents of the channel list stored in the IP STB, and joins the multicast group of the default switch-on channel.

FIG. 5 is the IP STB operation flowchart of a fifth embodiment of this invention. As shown in FIG. 5, when an IP STB is switched on in a random situation (including an abnormal situation), the IP STB negotiates with a broadband access server through relevant protocols and the broadband access server allocates an IP address for the communication of the IP STB after a successful negotiation; then the IP STB composes an IGMP Report message based on the contents of the channel list stored in the IP STB and sends the IGMP Report message, applying to join the multicast group of the default switch-on channel.

Upon receiving the IGMP Report message from the IP STB, the DSLAM queries whether there is a multicast flow being transmitted to the IP STB currently, and, if there is a multicast flow being transmitted to the IP STB currently, the DSLAM ceases the transmission to the IP STB and may further refuse to allow the IP STB to join the multicast group of the default switch-on channel; otherwise the DSLAM allows the IP STB to join the multicast group of the default switch-on channel. And when the IP STB does not receive any more multicast flow from the DSLAM, the IP STB composes an IGMP Report message based on the contents of the channel list stored in the IP STB and sends the IGMP Report message to join the multicast group of the default switch-on channel.

It can be seen from FIG. 4 and FIG. 5 that when an IP STB is switched on after an abnormal shutdown, a DSLAM on the network side can initiatively cease the transmission of the multicast flow which continues after malfunction occurred to the IP STB so that simultaneous issuance of two multicast flows is prevented.

The present invention also can provide an IP STB and a DSLAM to implement the above-mentioned method.

To sum up, the method provided by the embodiments of the present invention prevents simultaneous issuance of two multicast flows in the prior art and thus eliminates unfavorable consequences of simultaneous issuance of two multicast flows, including picture quality loss and even abnormal restart of an IP STB, therefore the user experiences will be improved and user satisfaction will be distinctively increased.

What is claimed is:

1. A method for preventing simultaneous issuance of two multicast flows, comprising:

ceasing, by a digital subscriber line access multiplexer (DSLAM), a transmission of a multicast flow to an Internet protocol set-top box (IP STB) when the IP STB is switched on;

automatically composing and sending an IGMP Report message, by the IP STB immediately upon being switched on, based on contents of a channel list stored in the IP STB, and joining a multicast group of a default switch-on channel;

according to a received user instruction, performing switching channels, wherein the switching channels comprises: sending the IGMP Leave message to leave a current multicast group; searching a multicast IP address and a multicast port number of a channel chosen by a user in a channel list; composing the IGMP Report message based on the multicast IP address and the multicast port number found and sending the IGMP Report message to join a new multicast group;

when the IP STB joining the new multicast group, if the channel chosen by the user is not the default switch-on channel, updating the multicast IP address, the multicast port number and verification information of the new multicast group with the multicast IP address, the multicast port number and verification information stored in the IP STB; and if the channel chosen by the user is the default switch-on channel, not updating the multicast IP address, the multicast port number and verification information of the new multicast group.

2. The method of claim 1, wherein ceasing the transmission of the multicast flow to the IP STB comprises:

upon being switched on, the IP STB composing and sending an Internet group management protocol (IGMP) Leave message based on information stored in the IP STB;

upon receiving the IGMP Leave message from the IP STB, the DSLAM ceasing the transmission of the multicast flow corresponding to the IGMP Leave message sent by the IP STB.

3. The method of claim 2, wherein the information stored in the IP STB comprises a multicast IP address, a multicast port number and verification information of the channel which a user has been watching when the IP STB is powered off, and the information is stored in a non volatile memory (NVM) of the IP STB.

4. The method of claim 1, wherein the process of ceasing the transmission of the multicast flow to the IP STB comprises:

when the DSLAM knows that the IP STB has successfully accessed a network, querying, by the DSLAM, whether there is a multicast flow being transmitted to the IP STB, if there is a multicast flow being transmitted to the IP STB, ceasing the transmission of the multicast flow to the IP STB.

5. The method of claim 1, wherein after the IP STB composing and sending the IGMP Report message based on contents of a channel list stored in the IP STB, and joining a multicast group of a default switch-on channel, the method further comprises:

upon the DSLAM receiving the IGMP Report message from the IP STB, querying by the DSLAM whether there is a multicast flow being transmitted to the IP STB, if there is a multicast flow, ceasing a transmission of the multicast flow to the IP STB by the DSLAM.

6. The method of claim of 1, wherein the multicast IP address, the multicast port number and verification information stored in the IP STB are updated with corresponding information of the new multicast group when the IP STB joins the new multicast group.

7. The method of claim of 3, wherein the multicast IP address, the multicast port number and the verification information are stored in an information file in a file system of the NVM, or stored in a block in the file system of the NVM.

8. The method of claim of 2, wherein the information stored in the IP STB is stored in a channel list in a memory of the IP STB, including a multicast IP addresses and multicast port numbers of all channels which a user is authorized to watch;

the process of composing and sending the IGMP Leave message comprises composing and sending multiple IGMP Leave messages based on the multicast IP addresses and the multicast port numbers of all channels in the channel list in turn.

* * * * *